(12) United States Patent
Kuroda et al.

(10) Patent No.: US 12,183,903 B2
(45) Date of Patent: Dec. 31, 2024

(54) STORAGE BATTERY DEVICE (71) Applicant: KABUSHIKI KAISHA TOSHIBA, Tokyo (JP)

(72) Inventors: Kazuto Kuroda, Tokyo (JP); Masahiro Sekino, Tokyo (JP); Akio Nishimaki, Kanagawa (JP); Hideo Yamasaki, Tokyo (JP); Teruyoshi Kogure, Tokyo (JP); Yosuke Saeki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 17/518,681

(22) Filed: Nov. 4, 2021

(65) Prior Publication Data

US 2022/0059883 A1    Feb. 24, 2022

Related U.S. Application Data

(63) Continuation of application No. PCT/JP2019/034861, filed on Sep. 4, 2019.

(30) Foreign Application Priority Data

May 14, 2019    (JP) .................................. 2019-091488

(51) Int. Cl.
*H01M 10/613*    (2014.01)
*H01M 10/625*    (2014.01)
(Continued)

(52) U.S. Cl.
CPC ....... *H01M 10/613* (2015.04); *H01M 10/625* (2015.04); *H01M 10/647* (2015.04); *H01M 10/653* (2015.04); *H01M 10/6552* (2015.04); *H01M 10/6553* (2015.04); *H01M 10/6556* (2015.04); *H01M 50/209* (2021.01); *H01M 50/227* (2021.01); *H01M 50/502* (2021.01); *H01M 50/296* (2021.01);
(Continued)

(58) Field of Classification Search
CPC ......... H01M 10/6552; H01M 10/6569; H01M 10/6553
See application file for complete search history.

(56) References Cited

U.S. PATENT DOCUMENTS

| 6,373,226 B1* | 4/2002 | Itou | ..................... H01M 10/441 320/132 |
| 2006/0169507 A1 | 8/2006 | Inoue et al. | |

(Continued)

FOREIGN PATENT DOCUMENTS

| DE | 102009035458 A1 * | 2/2011 | ........ H01M 10/4207 |
| DE | 102011003964 A1 | 8/2012 | |

(Continued)

OTHER PUBLICATIONS

Machine translation of DE-102009035458-A1 (Year: 2011).*
(Continued)

*Primary Examiner* — Gregg Cantelmo
(74) *Attorney, Agent, or Firm* — Maier & Maier, PLLC (57) ABSTRACT

A storage battery device includes: a cell unit including a plurality of battery cells; an electric flow path material that forms a current path through which electric power is supplied from or to the battery cells; and a radiator thermally coupled to the current-path member.

18 Claims, 11 Drawing Sheets

(51) Int. Cl.
    *H01M 10/647*    (2014.01)
    *H01M 10/653*    (2014.01)
    *H01M 10/6552*   (2014.01)
    *H01M 10/6553*   (2014.01)
    *H01M 10/6556*   (2014.01)
    *H01M 50/209*    (2021.01)
    *H01M 50/227*    (2021.01)
    *H01M 50/296*    (2021.01)
    *H01M 50/50*     (2021.01)
    *H01M 50/502*    (2021.01)
    *H01M 50/55*     (2021.01)
    *H01M 50/566*    (2021.01)

(52) U.S. Cl.
    CPC .......... *H01M 50/55* (2021.01); *H01M 50/566* (2021.01); *H01M 2220/20* (2013.01)

(56) References Cited

U.S. PATENT DOCUMENTS

| | | | | |
|---|---|---|---|---|
| 2006/0261783 | A1* | 11/2006 | Gamboa | H02J 1/10 320/138 |
| 2009/0253029 | A1* | 10/2009 | Inoue | H01M 10/652 429/71 |
| 2011/0305935 | A1* | 12/2011 | Yoon | H01M 10/6554 429/120 |
| 2012/0100407 | A1 | 4/2012 | Inoue et al. | |
| 2013/0164595 | A1* | 6/2013 | Takase | H01M 10/6554 429/120 |
| 2015/0325894 | A1 | 11/2015 | Merriman et al. | |
| 2017/0365897 | A1 | 12/2017 | Okada et al. | |
| 2018/0301772 | A1 | 10/2018 | Morita et al. | |
| 2019/0014690 | A1 | 1/2019 | Miura | |

FOREIGN PATENT DOCUMENTS

| | | |
|---|---|---|
| JP | 2004-306726 A | 4/2003 |
| JP | 2006-185863 A | 12/2004 |
| JP | 2006-318704 A | 5/2005 |
| JP | 2006-216303 A | 8/2006 |
| JP | 2011-009402 | 1/2011 |
| JP | 2012-216360 A | 3/2011 |
| JP | 2015-115275 A | 12/2013 |
| JP | 2015-179613 A | 3/2014 |
| JP | 2016-220363 A | 5/2015 |
| JP | 2017-515275 A | 6/2017 |
| JP | 2019-016564 A | 1/2019 |
| KR | 20170034560 A | 3/2017 |
| WO | WO 2016/157263 A1 | 10/2016 |
| WO | WO 2017/073258 A1 | 5/2017 |
| WO | 2018235473 A1 | 12/2018 |

OTHER PUBLICATIONS

Office Action issued on Oct. 18, 2023, in corresponding Chinese Application No. 201980093716.1, 32 pages.

Extended Search Report issued on Jan. 3, 2024, in corresponding European Application No. 19928846.5, 8 pages.

* cited by examiner

STORAGE BATTERY DEVICE

CROSS-REFERENCE TO RELATED APPLICATION(S)

This application is a continuation of International Patent Application No. PCT/JP2019/034861 filed Sep. 4, 2019, which is based upon and claims the benefit of priority from Japanese Patent Application No. 2019-091488, filed May 14, 2019, the entire contents of each of which are incorporated herein by reference.

BACKGROUND

Field

Embodiments described herein relate generally to a storage battery device.

Description of Related Art

Conventionally, storage battery devices have been used in various fields.

The output voltage of battery cells constituting such a storage battery device is several volts. Thus, to generate a voltage of for example 48 V commonly employed in manufacturing or hybrid vehicle, for example, it is conceivable to connect a required number of battery cells in series or to boost the voltage thereof using a DC-DC converter.

SUMMARY

In the case of using a DC-DC converter, when an output voltage 24 V of an assembled battery is boosted twice to 48 V for use in industrial machines or a hybrid vehicle for output, for example, a current flowing through the assembled battery is double or more of an output current.

In this case, heat generation due to copper loss is in proportion to the square of a current by Ohm's law, so that the amount of heat from the current path in the assembled battery quadruples.

Furthermore, the storage battery device typically tolerates a flow of a large temporary current in view of a variation in load. However, a current-path member serving as a charge and discharge path, such as a terminal and a bus bar, has a smaller thermal time constant than the battery cells filled with battery materials. Because of this, the current-path member rapidly increases in temperature due to a temporary larger current.

Thus, in a storage battery device incorporating a DC-DC converter, in which a current flowing through the assembled battery is several times as large as an output current, it is desirable to promptly remove temporarily generated heat in the current-path member. Examples of related art include JP-A-2006-185863, JP-A-2004-306726, JP-A-2016-220363, and JP-A-2019-016564.

DETAILED DESCRIPTION OF PREFERRED EMBODIMENTS

Embodiments provide a storage battery device capable of efficiently cooling current flow path members, that facilitates miniaturization, and ensures a high voltage output and a high electric power output.

In general, according to one embodiment, a storage battery device includes: a cell unit configured from a plurality of electric cells; current flow path members forming a current flow path of electric power supplied from the plurality of electric cells or of electric power supplied to the plurality of electric cells; and a radiator thermally coupled to the current flow path members.

Preferable embodiments will be described in detail with reference to the accompanying drawings.

The following will describe a storage battery device installed in an automatic guided vehicle (AGV) as an example of storage battery devices of embodiments. The disclosure is not limited to this type of storage battery device and the storage battery device can be used in many devices.

[1] First Embodiment

Figure 1:
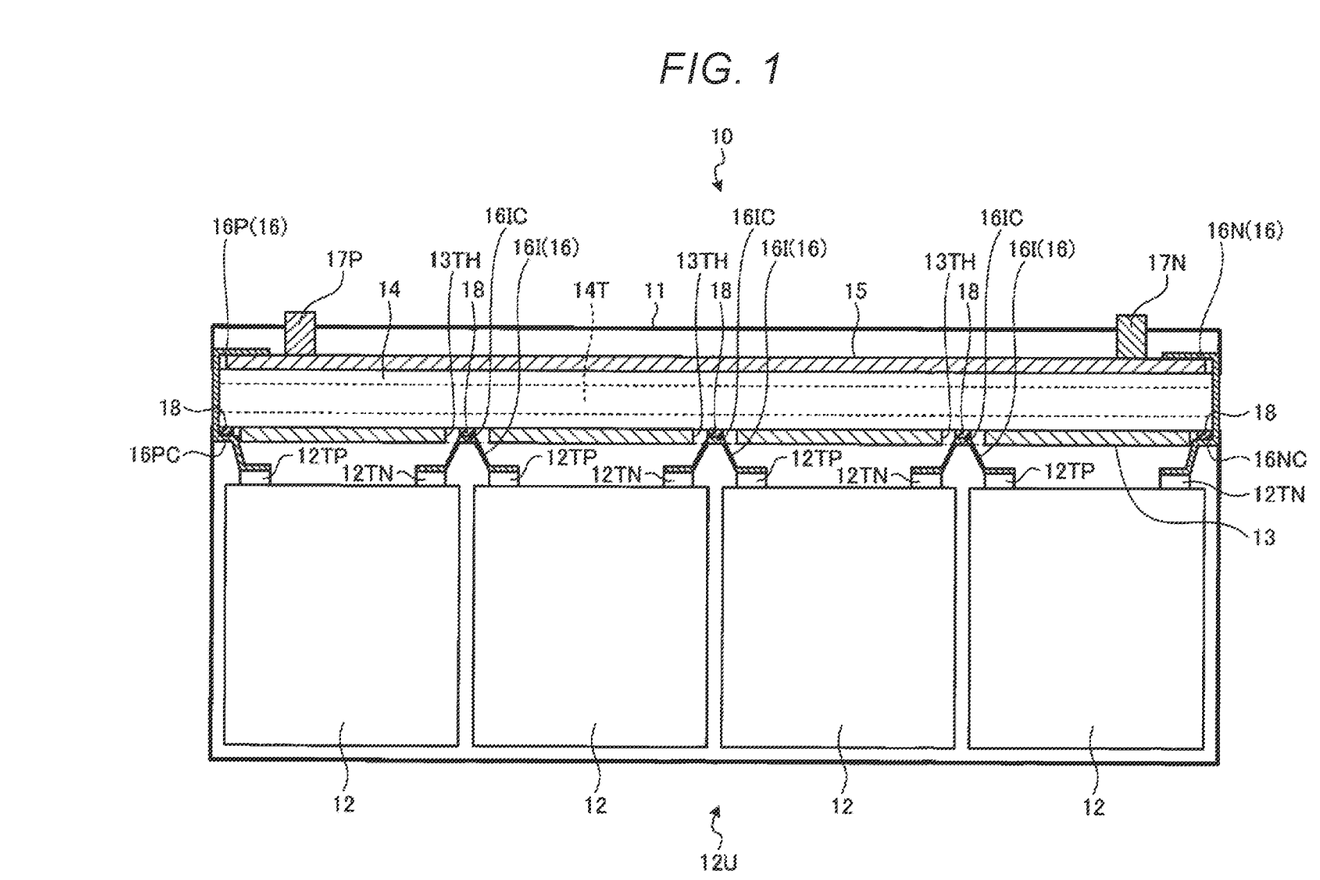
FIG. 1 is an explanatory diagram showing schematic configurations of a storage battery device according to a first embodiment.

FIG. 1 is an explanatory diagram showing a schematic configuration of a storage battery device 10 according to a first embodiment.

The storage battery device 10 generally includes a casing 11, battery cells 12, a battery management unit 13, a radiator 14, a DC-DC converter 15, bus bars 16, a positive-electrode-side charge and discharge terminal 17P, a negative-electrode-side charge and discharge terminal 17N, and heat conductive materials 18.

The battery cells 12 are electrically connected to one another and constitute a cell unit 12U as a whole.

The casing 11 is formed of a resin material, for example, and accommodates the battery cells 12, the battery management unit 13, the radiator 14, the DC-DC converter 15, the bus bars 16, the heat conductive materials 18, the positive-electrode-side charge and discharge terminal 17P, and the negative-electrode-side charge and discharge terminal 17N.

The positive-electrode-side charge and discharge terminal 17P and the negative-electrode-side charge and discharge terminal 17N protrude from the casing 11.

Each of the battery cells 12 includes a positive-electrode-side cell charge and discharge terminal 12TP and a negative-electrode-side cell charge and discharge terminal 12TN.

Figure 2:
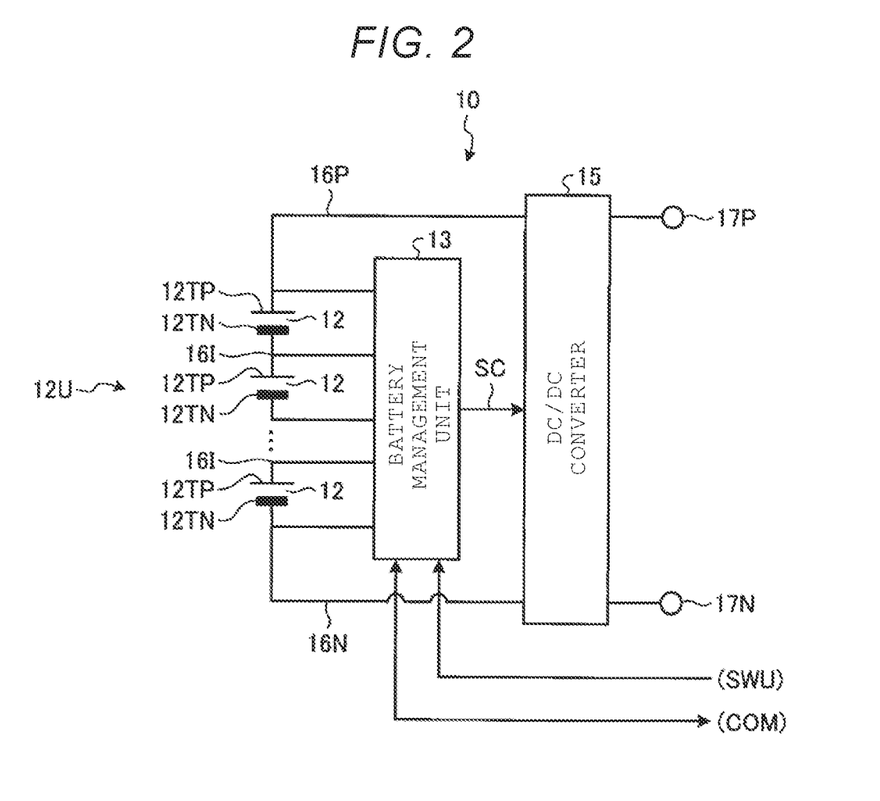
FIG. 2 is a block diagram configurations of a control system in the storage battery device according to the first embodiment.

FIG. 2 is a block diagram showing a control system configuration of the storage battery device 10 according to the present embodiment.

The battery management unit 13 is configured to be initiated by a start signal SWU from a controller, not shown, in the vehicle body of the automatic guided vehicle, and to be able to exchange communication data COM with the controller via a communication line.

The battery management unit 13 also serves to detect the voltages and temperatures of the battery cells 12 to perform charge and discharge management, and output a control signal SC to the DC-DC converter 15 to interrupt a current from a main circuit (a circuit in the automatic guided vehicle), if necessary.

In this case, as shown in FIG. 1, the substrate of the battery management unit 13 is provided with a plurality of through holes 13TH for ensuring a space in which the bus bars 16 are thermally coupled to the radiator 14.

The radiator 14 has a tubular shape with a hollow part 14T, and serves to dissipate heat transmitted from the battery cells 12 via the bus bars 16, to dissipate heat from the battery management unit 13, and to dissipate heat from the DC-DC converter 15, to thereby maintain the battery cells 12, the battery management unit 13, and the DC-DC converter 15 to be equal to or lower than predetermined temperatures, respectively.

As described above, the bus bars 16 and the DC-DC converter 15 are disposed to face each other across the radiator 14. Thus, by allowing a sufficient amount of a coolant to flow into the hollow part 14T, the heat generated from both the bus bars 16 and the DC-DC converter 15 is removed, and which can prevent transmission of the heat between them via the radiator 14 to affect each other.

The DC-DC converter 15 serves to supply charging power to the battery cells 12 from a charging device, not shown, which is connected to the automatic guided vehicle body via the positive-electrode-side charge and discharge terminal 17P and the negative-electrode-side charge and discharge terminal 17N. The DC-DC converter 15 also boosts the voltage of discharged power from the battery cells 12 and supplies a boosted voltage to the automatic guided vehicle body via the positive-electrode-side charge and discharge terminal 17P and the negative-electrode-side charge and discharge terminal 17N. Further, the DC-DC converter 15 can interrupt a current in response to receipt of the control signal SC from the battery management unit 13.

The bus bars 16 generally include bus bars 16I that connect between two battery cells 12 (between the positive-electrode-side cell charge and discharge terminal 12TP of one of the two cells 12 and the negative-electrode-side cell charge and discharge terminal 12TN of the other cell 12); a bus bar 16P that connects a positive-electrode-side cell charge and discharge terminal 12TP of the cell 12 closest to the high potential side and a high potential-side terminal (not shown) of the DC-DC converter 15; and a bus bar 16N that connects the negative-electrode-side cell charge and discharge terminal 12TN of the cell 12 closest to the low potential side and a lower potential-side terminal (not shown) of the DC-DC converter 15.

Figure 3:
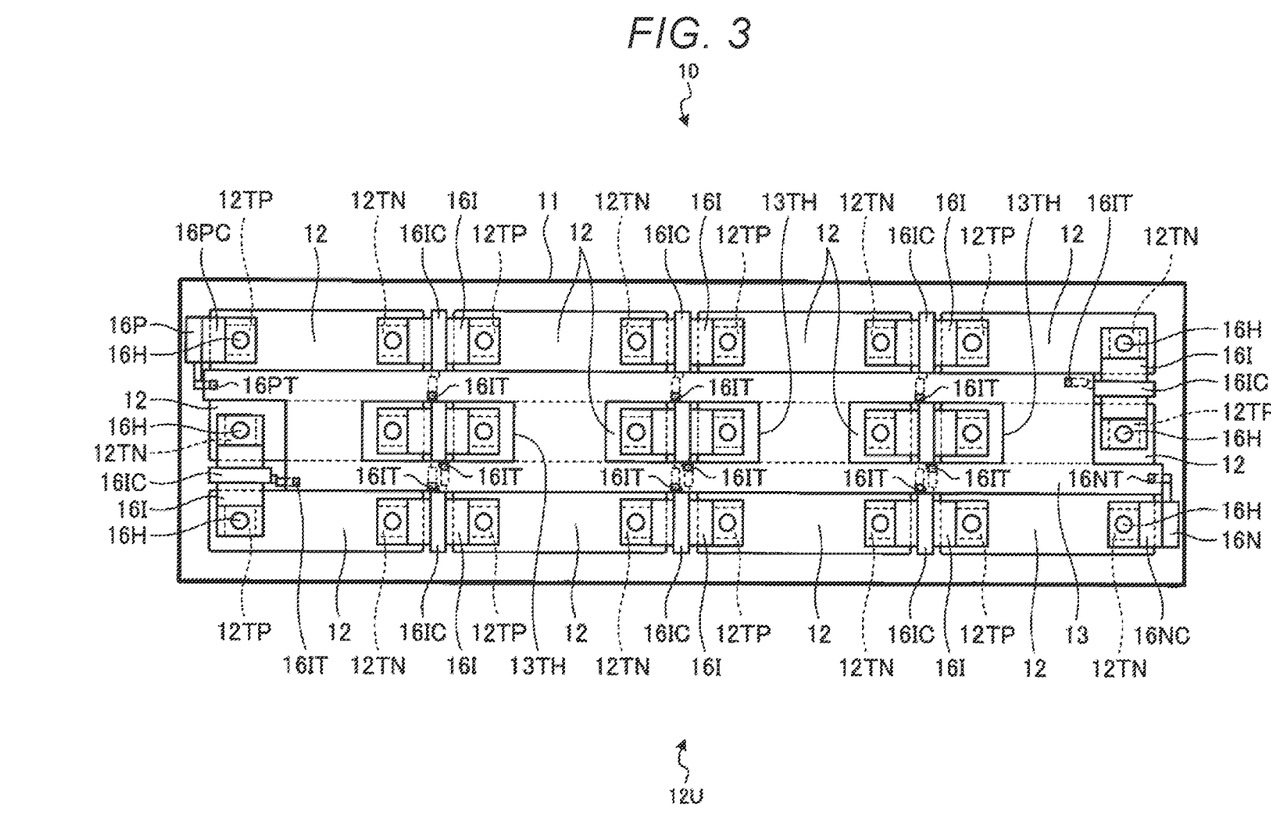
FIG. 3 is a plan view of the storage battery device of the first embodiment, depicting a part below a radiator.

FIG. 3 is a plan view of the storage battery device of the first embodiment, depicting a part below the radiator 14.

The storage battery device 10 includes the battery management unit 13, thermally coupled to the radiator 14, on the front side in a plan view. The bus bars 16I, the bus bar 16P, and the bus bar 16N are located in a part in which the battery management unit 13 is not placed and from the through holes 13TH formed in the substrate of the battery management unit 13.

In the example of FIG. 3, twelve battery cells 12 are connected in series between the bus bar 16P and the bus bar 16N.

Each of the bus bars 16I is electrically connected to the battery management unit 13 via an electrical connection 16IT. Similarly, the bus bar 16P is electrically connected to the battery management unit 13 via an electrical connection 16PT while the bus bar 16N is electrically connected to the battery management unit 13 via an electrical connection 16NT.

In such a case, in the example of FIG. 3, the bus bars 16I, the bus bar 16P, and the bus bar 16N are connected to the positive-electrode-side cell charge and discharge terminals 12TP or the negative-electrode-side cell charge and discharge terminals 12TN of the battery cells 12 in bus bar openings 16H of a circular form by welding.

Further, the electrical connections 16IT, the electrical connection 16PT, and the electrical connection 16NT are electrically connected to the substrate of the battery management unit 13 by soldering or screwing.

Thus, the battery management unit 13 performs charge and discharge management of each of the battery cells 12.

Figure 4:
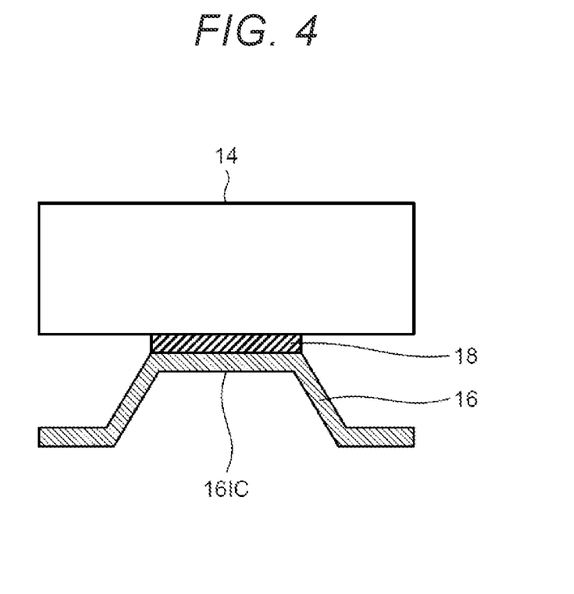
FIG. 4 is an enlarged view of a part where a heat conductive material is disposed of the first embodiment.

FIG. 4 is an enlarged view of a part in which the heat conductive material 18 is disposed.

The heat conductive material 18 is formed as, for example, an insulating sheet having a heat dissipation property (heat conductivity). As shown in FIG. 4, the heat conductive material 18 tightly contacts the bus bar 16 and the radiator 14 fixed to the casing by compressive force applied from the radiator 14 side toward the bus bar 16. In this case, it is possible to apply adhesiveness to both sides of the heat conductive material 18 to improve ease of manufacturing and assembly.

In the case of using the radiator 14 with insulating properties, such as one having an insulating resin film or insulating ceramics (for example, aluminum nitride) formed on the surface or the one formed from an insulating material, the heat conductive material 18 can be a thermally conductive adhesive.

In the first embodiment, as shown in FIG. 1, heat dissipation connections 16IC of the bus bars 16I serve to thermally couple the heat conductive material 18 to the radiator 14 in an insulated state via the through hole 13TH of the battery management unit 13.

Similarly, as shown in FIG. 1, a heat dissipation connection 16PC of the bus bar 16P and a heat dissipation connection 16NC of the bus bar 16N serve to thermally couple the heat conductive material 18 to the radiator 14 in an insulated state in the part in which the substrate of the battery management unit 13 is not placed (possibly in the through hole 13TH).

The heat dissipation connections 16IC of the bus bars 16I, the heat dissipation connection 16PC of the bus bar 16P, and the heat dissipation connection 16NC of the bus bar 16N can be set larger in width (vertical length in FIG. 3) than the rest of the bus bars 16I, the bus bar 16P, and the bus bar 16N. This leads to enhancing the heat dissipation efficiency.

The forms of the heat dissipation connection 16IC of the bus bars 16I, the heat dissipation connection 16PC of the bus bar 16P, and the heat dissipation connection 16NC of the bus bar 16N are not limited to the examples as above. Other structures can be suitably adopted as long as they can more efficiently dissipate heat toward the radiator 14.

According to the first embodiment, the bus bars 16 (the bus bars 16I, the bus bar 16P, and the bus bar 16N) can be effectively cooled. As a result, the battery cells 12 can be effectively cooled via the positive-electrode-side cell charge and discharge terminals 12TP and the negative-electrode-side cell charge and discharge terminals 12TN. Thereby, the battery cells 12 can each provide a higher output without an output limitation.

That is, with the same output, the storage battery device can be made more compact in size. With the same device scale, a higher-output storage battery device can be provided.

[2] Second Embodiment

Next, a second embodiment will be described.

Figure 5:
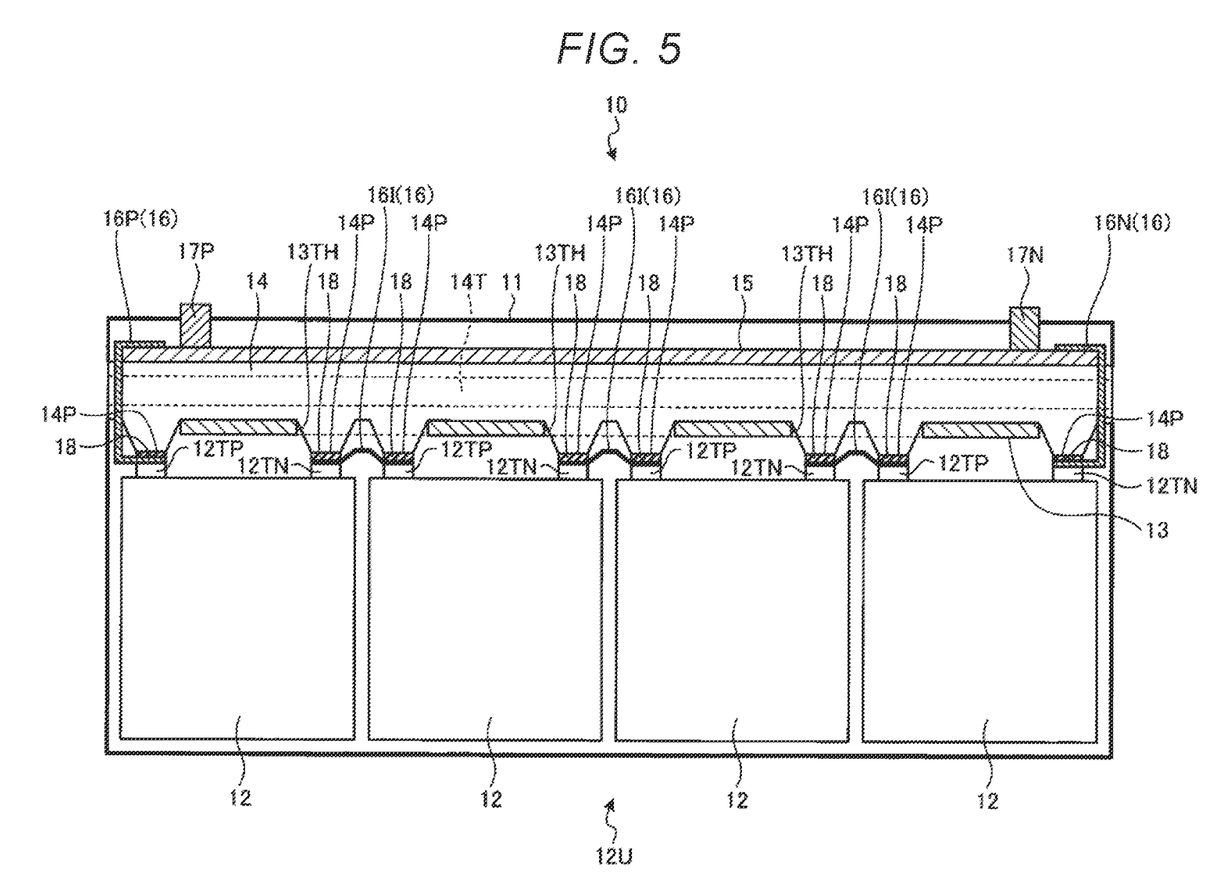
FIG. 5 is an explanatory diagram showing a schematic configuration of a storage battery device according to a second embodiment.

The second embodiment is different from the first embodiment in that electrode terminals (the positive-electrode-side cell charge and discharge terminals 12TP and the negative-electrode-side cell charge and discharge terminals 12TN) of the battery cells 12 are thermally coupled to the radiator 14, in place of the bus bars 16 being thermally coupled to the radiator 14.

FIG. 5 is an explanatory diagram showing a schematic configuration of a storage battery device of the second embodiment. In FIG. 5, the same or like constituents as in the first embodiment shown in FIG. 1 are denoted by the same reference numerals, and the detailed descriptions in the first embodiment will be incorporated.

The radiator 14 has a tubular shape with a hollow part 14T and is provided with a plurality of protrusions 14P to be thermally coupled to the positive-electrode-side cell charge and discharge terminals 12TP and negative-electrode-side cell charge and discharge terminals 12TN of the battery cells 12.

The substrate of the battery management unit 13 is provided with a plurality of through holes 13TH for ensuring a space in which the protrusions 14P are thermally coupled to the positive-electrode-side cell charge and discharge terminals 12TP and the negative-electrode-side cell charge and discharge terminals 12TN of the battery cells 12.

Each of the heat conductive materials 18 is disposed between the protrusion 14 and the positive-electrode-side cell charge and discharge terminal 12TP or the negative-electrode-side cell charge and discharge terminal 12TN of the battery cell 12 facing the protrusion 14P, The heat conductive materials 18 tightly contact with the positive-electrode-side cell charge and discharge terminal 12TP or the negative-electrode-side cell charge and discharge terminal 12TN, and the radiator 14 is fixed to the casing 11 by compressive force applied from the radiator 14 side toward the positive-electrode-side cell charge and discharge terminal 12TP or the negative-electrode-side cell charge and discharge terminal 12TN.

As a result, the radiator 14 works to dissipate the heat of the battery cells 12 transmitted from the positive-electrode-side cell charge and discharge terminals 12TP or the negative-electrode-side cell charge and discharge terminals 12TN thermally coupled to the protrusions 14P, to thereby maintain the battery cells 12 to be equal to or lower than the predetermined temperatures.

In parallel with the above, the radiator 14 dissipates the heat from the battery management unit 13 and the heat from the DC-DC converter 15 to thereby maintain the battery management unit 13 and the DC-DC converter 15 to be equal to or lower than the predetermined temperatures, respectively.

According to the second embodiment, the positive-electrode-side cell charge and discharge terminals 12TP or the negative-electrode-side cell charge and discharge terminals 12TN of the battery cells 12 can be effectively cooled. As a result, the battery cells 12 can be effectively cooled via the positive-electrode-side cell charge and discharge terminals 12TP and the negative-electrode-side cell charge and discharge terminals 12TN. Thereby, the battery cells 12 can each provide a higher output without an output limitation.

Thus, according to the second embodiment, with the same output, the storage battery device can be made more compact in size. With the same device scale, a higher-output storage battery device can be provided.

[3] Third Embodiment

Next, a third embodiment will be described.

Figure 6:
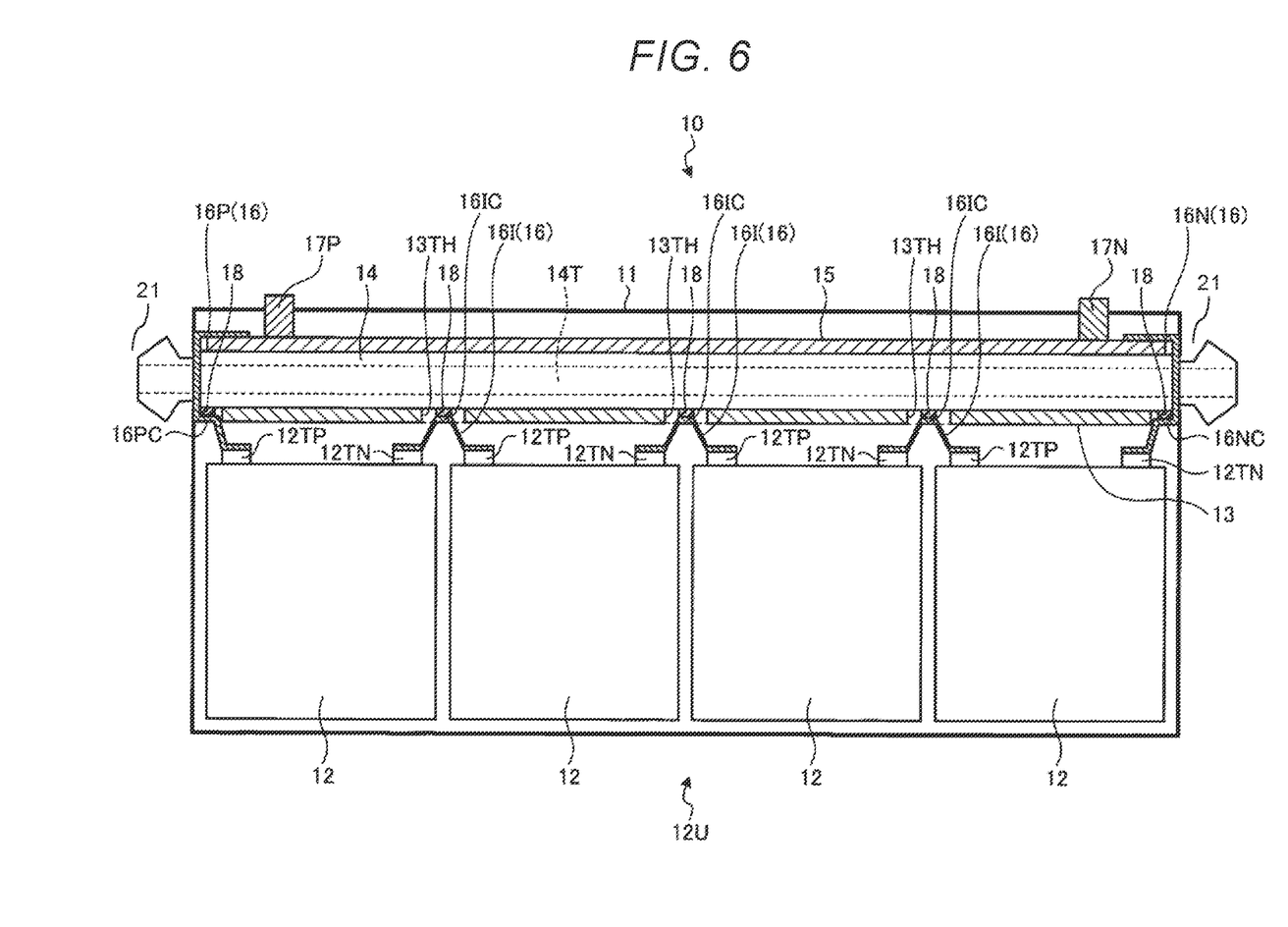
FIG. 6 is an explanatory diagram showing a schematic configuration of a storage battery device according to a third embodiment.

FIG. 6 is an explanatory diagram showing a schematic configuration of a storage battery device of the third embodiment. In FIG. 6, the same or like constituents as in the first embodiment shown in FIG. 1 are denoted by the same reference numerals, and the detailed descriptions in the first embodiment will be incorporated.

The third embodiment is different from the first embodiment in that the radiator 14 includes joints 21 at both ends of the hollow part 14T, and the radiator 14 is connected to a coolant supply circulation system (not shown) via the joints 21 to allow a coolant to flow into the hollow part 14T.

Owing to such a configuration, the bus bars 16 (the bus bars 16I, the bus bar 16P, and the bus bar 16N) of the third embodiment can be more effectively cooled than those of the first embodiment. As a result, the battery cells 12 can be effectively cooled via the positive electrode-side cell charge and discharge terminals 12TP and the negative-electrode-side cell charge and discharge terminals 12TN. Thereby, the battery cells 12 can each provide a higher output without an output limitation.

This leads to further downsizing the storage battery device or further heightening the output of the storage battery device.

[4] Fourth Embodiment

Next, a fourth embodiment will be described.

Figure 7:
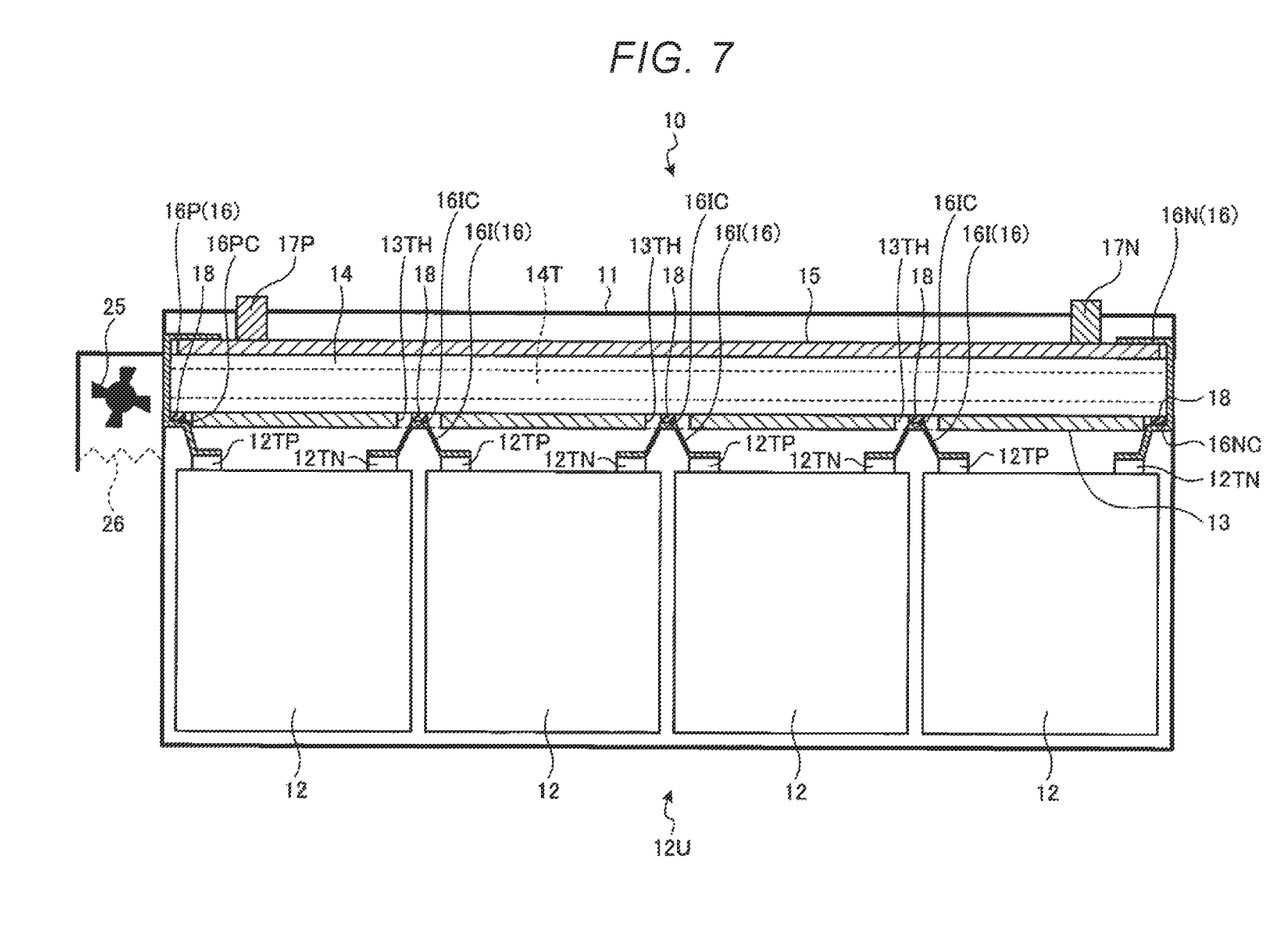
FIG. 7 is an explanatory diagram showing a schematic configuration of a storage battery device according to a fourth embodiment.

FIG. 7 is an explanatory diagram showing a schematic configuration of a storage battery device of the fourth embodiment. In FIG. 7, the same or like constituents as in the first embodiment shown in FIG. 1 are denoted by the same reference numerals, and the detailed descriptions in the first embodiment will be incorporated.

The fourth embodiment is different from the first embodiment in that the radiator 14 includes an air blower 25 at one end of the hollow part 14T to forcibly supply air having passed through a filter 26 to the hollow part 14T and forcibly discharge the air via an opening at the other end of the hollow part 14T.

Owing to such a configuration, the radiator 14 can collect the heat to more effectively cool the bus bars 16, the battery cells 12, the battery management unit 13, and the DC-DC converter 15. This makes it possible to further downsize the storage battery device or further heighten the output of the storage battery device.

[5] Fifth Embodiment

Next, a fifth embodiment will be described.

Figure 8:
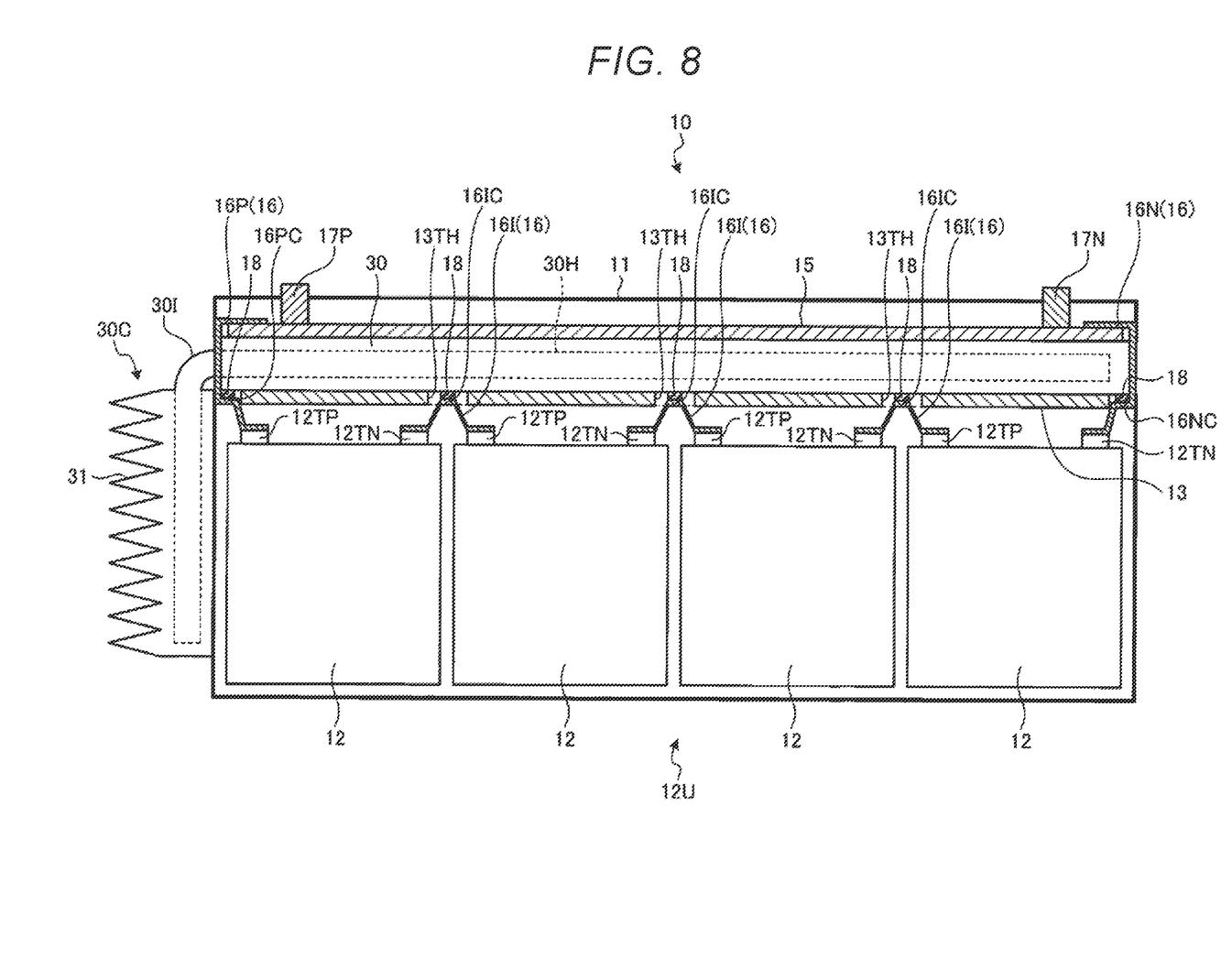
FIG. 8 is an explanatory diagram showing a schematic configuration of a storage battery device according to a fifth embodiment.

FIG. 8 is an explanatory diagram schematically showing a schematic configuration of a storage battery device of the fifth embodiment. In FIG. 8, the same or like constituents as in the first embodiment shown in FIG. 1 are denoted by the same reference numerals, and the detailed descriptions in the first embodiment will be incorporated.

The fifth embodiment is different from the first embodiment in including a heat pipe 30 in place of the structure of radiator 14, but still functioning as a radiator. The heat pipe 30 is provided with a wick (not shown) inside, and the wick contains an operating fluid.

The heat pipe 30 further includes an evaporator (heat-absorber) 30H thermally connected to the bus bars 16, the battery management unit 13, and the DC-DC converter 15, a heat insulator 30I, and a condenser (heat dissipater) 30C connected to the evaporator 30H via the heat insulator 30I and provided with a radiator 31.

By the configuration as above, the evaporator 30H collects the heat from the bus bars 16, the battery cells 12, the battery management unit 13, and the DC-DC converter 15 by evaporation of the operating fluid, and the evaporated operating fluid rapidly flows to the condenser 30C. The operating fluid is then condensed by the condenser 30C to emit evaporative latent heat, and discharges the heat collected from the bus bars 16, the battery management unit 13, and the DC-DC converter 15 to outside the storage battery device 10. The operating fluid is then refluxed to the evaporator 30H by the capillary action of the wick.

As described above, the heat pipe 30 can collect the heat to more effectively cool the bus bars 16, the battery cells 12, the battery management unit 13, and the DC-DC converter 15. This makes it possible to further downsize the storage battery device or further heighten the output of the storage battery device.

In addition, the evaporator 30H (heat dissipation surface) can be placed at any location, therefore, the storage battery device is suitable for, for example, vehicles with a limited installation space.

[6] Sixth Embodiment

Figure 9:
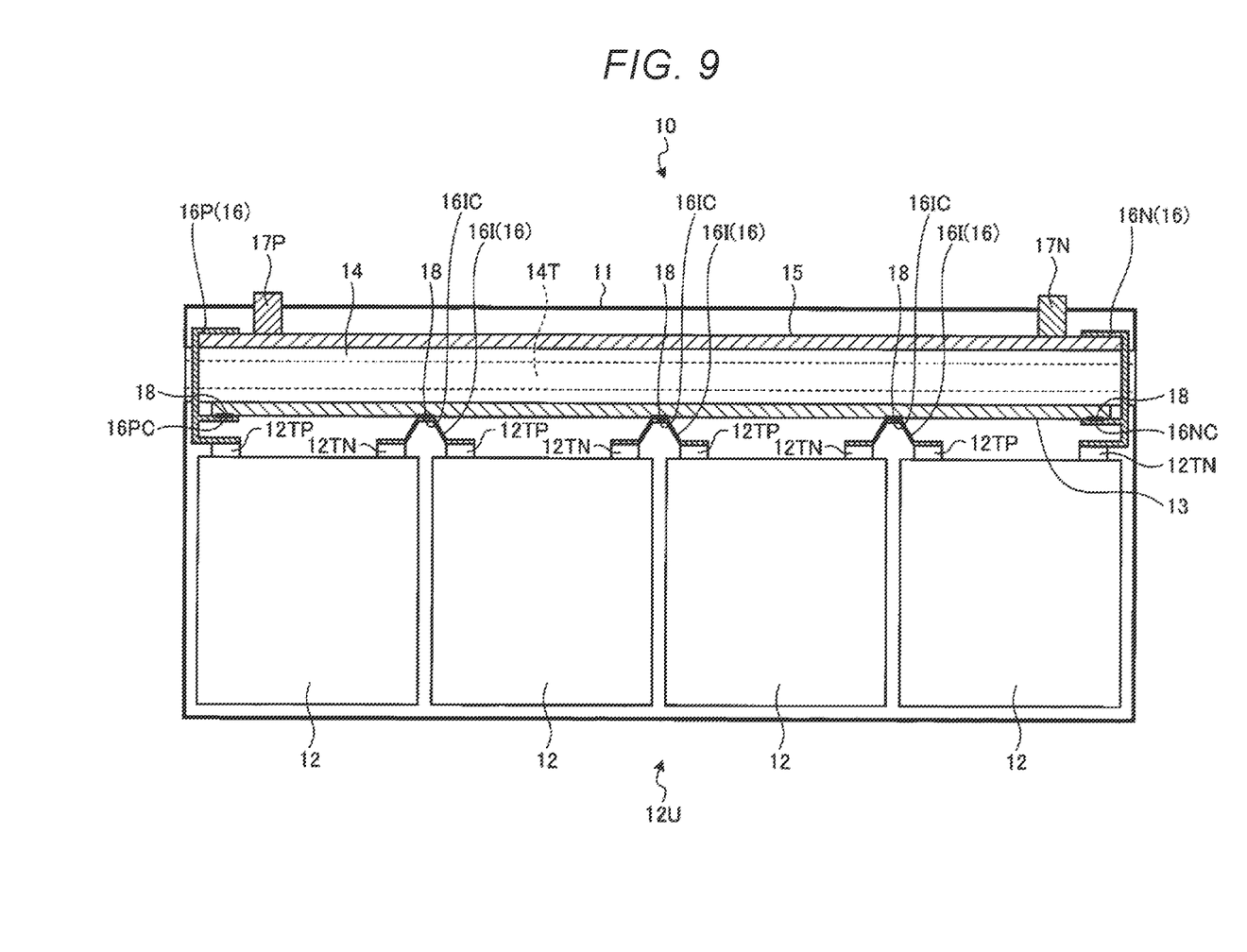
FIG. 9 is an explanatory diagram showing a schematic configuration of a storage battery device according to a sixth embodiment.

FIG. 9 is an explanatory diagram schematically showing a schematic configuration of a storage battery device of a sixth embodiment. In FIG. 9, the same or like constituents as in the first embodiment shown in FIG. 1 are denoted by the same reference numerals, and the detailed descriptions in the first embodiment will be incorporated.

The sixth embodiment is different from the first embodiment in that heat dissipation connections (for example, heat dissipation connections 16IC, 16PC, and 16NC) of the bus bars 16 are electrically connected to the substrate of the battery management unit 13 using the conductivity of the heat conductive members 18, and are thermally coupled to the radiator 14 via the substrate of the battery management unit 13.

In this case, the bus bars 16 and the substrate of the battery management unit 13 are electrically and thermally connected together with a conductive adhesive, blade springs, or screws, for example.

Owing to such a configuration, the radiator 14 can collect the heat of the bus bars 16 and the battery cells 12 via the substrate of the battery management unit 13.

Thus, according to the sixth embodiment, the bus bars 16, the battery cells 12, the battery management unit 13, and the DC-DC converter 15 can be more effectively cooled. This makes it possible to further downsize the storage battery device or further increase the output of the storage battery device.

[7] Seventh Embodiment

Next, a seventh embodiment will be described.

Figure 10:
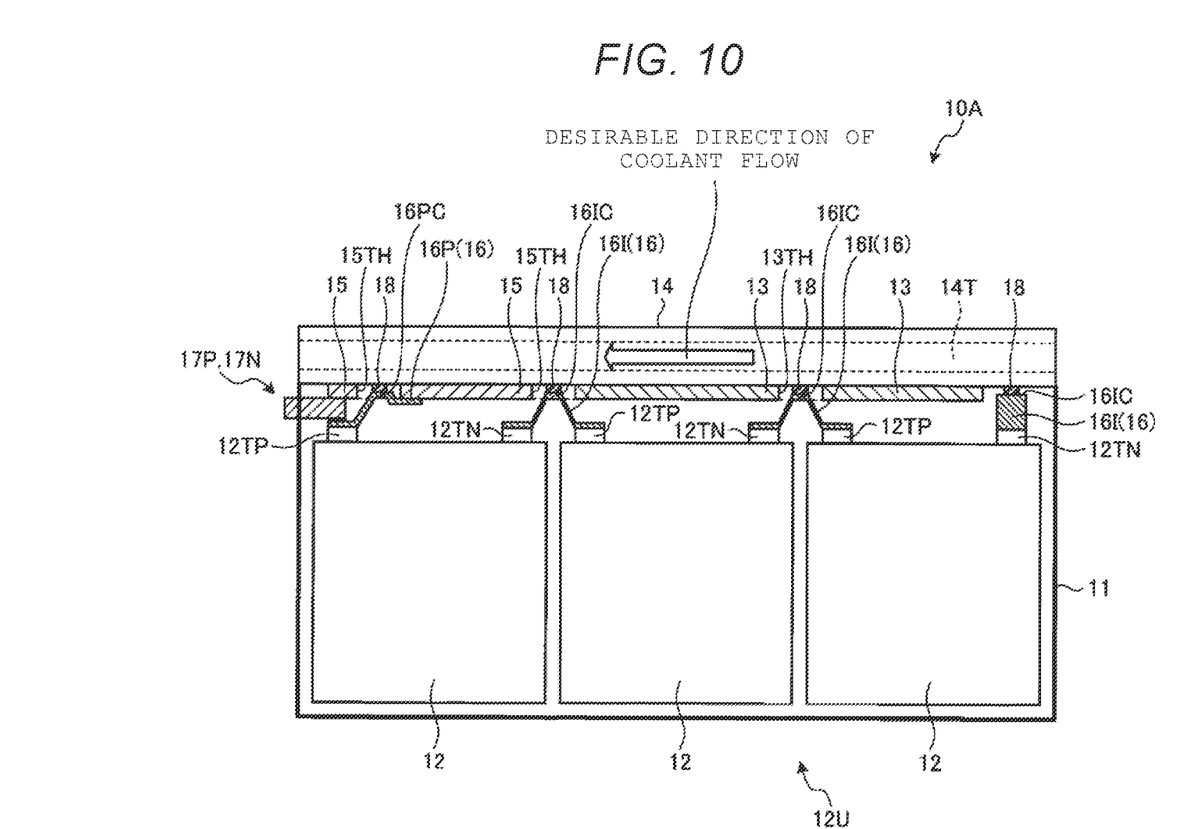
FIG. 10 is an explanatory diagram showing a schematic configuration of a storage battery device according to a seventh embodiment.

FIG. 10 is an explanatory diagram showing a schematic configuration of a storage battery device of the seventh embodiment. In FIG. 10, the same or like constituents as in the first embodiment shown in FIG. 1 are denoted by the same reference numerals.

The seventh embodiment is different from the first embodiment in that the battery management unit 13 and the DC-DC converter 15 are disposed on the surface of the radiator 14 facing the cells 12, and the positive-electrode-side charge and discharge terminal 17P and the charge and discharge terminal 17N are disposed on the same lateral face of the casing 11.

A storage battery device 10A generally includes a casing 11, battery cells (hereinafter simply referred to as cells) 12, a battery management unit 13, a radiator 14, a DC-DC converter 15, bus bars 16, charge and discharge terminals 17N and 17p, and heat conductive members 18.

The casing 11 is formed of a resin material, for example, and accommodates the battery cells 12, the battery management unit 13, the radiator 14, the DC-DC converter 15, the bus bars 16, and the heat conductive members 18. A positive-electrode-side charge and discharge terminal 17P and a negative-electrode-side charge and discharge terminal 17N protrude from the same lateral face (the left lateral face in FIG. 10).

Each of the battery cells 12 includes a positive-electrode-side cell charge and discharge terminal 12TP and a negative-electrode-side cell charge and discharge terminal 12TN.

Figure 11:
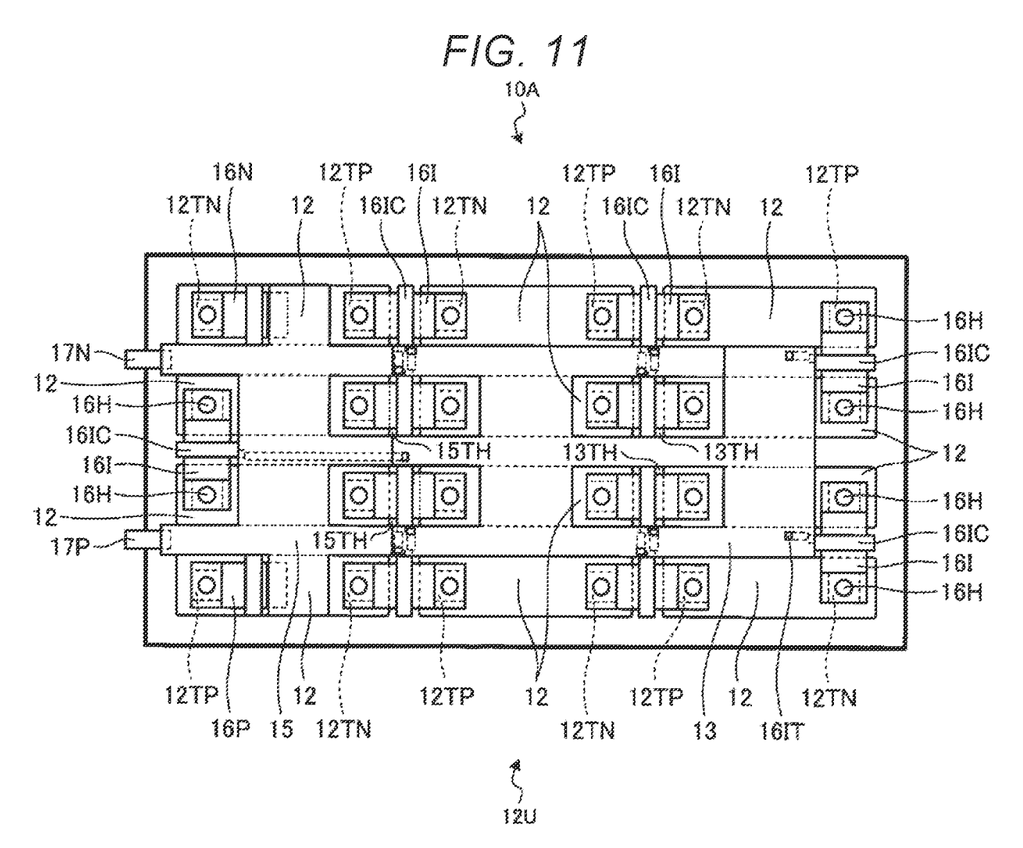
FIG. 11 is a plan view of the storage battery device according to the seventh embodiment, depicting a part below a radiator.

FIG. 11 is a plan view of the storage battery device of the seventh embodiment, depicting a part below the radiator.

The storage battery device 10A includes the battery management unit 13 thermally coupled to the radiator 14 on the front right side and the DC-DC converter 15 thermally coupled to the radiator 14 on the front left side in a plan view.

The bus bars 16I, the bus bar 16P, and the bus bar 16N are located in a part in which the battery management unit 13 is not placed, in the through holes 13TH formed in the substrate of the battery management unit 13, and in portions 15TH in which the DC-DC converter 15 is not placed.

In the example of FIG. 11, twelve battery cells 12 are connected in series between the bus bar 16P and the bus bar 16N. Each of the bus bars 16I is electrically connected to the battery management unit 13 via an electrical connection 16IT. Similarly, the bus bar 16P is electrically connected to the battery management unit 13 via an electrical connection 16PT while the bus bar 16N is electrically connected to the battery management unit 13 via the electrical connection 16NT.

Thus, the battery management unit 13 performs charge and discharge management of each of the battery cells 12.

In the seventh embodiment, as shown in FIG. 10, heat dissipation connections 16IC of the bus bars 16I serve to thermally couple the heat conductive members 18 to the radiator 14 in an insulated state via the portions in which the battery management unit 13 is not placed, via the through holes 13TH formed in the substrate of the battery management unit 13, and via the portions 15TH in which the DC-DC converter 15 is not placed.

Similarly, as shown in FIG. 10, a heat dissipation connection 16PC of the bus bar 16P and a heat dissipation connection 16NC of the bus bar 16N serve to thermally couple the heat conductive members 18 to the radiator 14 in an insulated state in the part in which the substrate of the DC-DC converter 15 is not placed, or possibly in the portion in which the battery management unit 13 is not placed or in the through holes 13TH.

In this case, as indicated by the arrow in FIG. 10, it is preferable to allow a coolant to flow from the battery management unit 13 generating less heat to the DC-DC converter 15 generating more heat, which can implement more efficient cooling.

According to the seventh embodiment as described above, the storage battery device of a more compact structure can effectively cool the battery management unit 13, the DC-DC converter 15, and the bus bars 16 (the bus bars 16I, the bus bar 16P, and the bus bar 16N). As a result, the battery cells 12 can be effectively cooled via the positive-electrode-side cell charge and discharge terminals 12TP and the negative-electrode-side cell charge and discharge terminals 12TH, Thereby, the battery cells 12 can each provide a higher output without an output limitation.

That is, with the same output, the storage battery device can be made more compact in size. With the same device scale, a higher-output storage battery device can be provided.

The above has described the example that the substrate of the battery management unit 13 and the substrate of the DC-DC converter 15 are independent from each other. However, the battery management unit 13 and the DC-DC converter 15 can be disposed on the same substrate and be thermally coupled to the radiator 14.

[8] Modification of the Embodiments

The above has not specifically described the bus bars 16 in terms of shape. The bus bars 16 can be increased in surface area to be able to dissipate more heat, or can have a larger contact area with the positive-electrode-side cell charge and discharge terminal 12TP and the negative-electrode-side cell charge and discharge terminal 12TN so as to reduce heat generation.

The above has described the example that the plurality of battery cells 12 is connected in series to constitute the cell unit 12U, however, this is not limiting. It is possible to connect the plurality of battery cells 12 in series-parallel to constitute the cell unit 12U.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

The invention claimed is:

1. A storage battery device, comprising:
    a cell unit including a plurality of battery cells;
    an electric flow path material configured to form a current path through which electric power is supplied from or to the battery cells; and
    a radiator thermally coupled to the electric flow path material, wherein
    the electric flow path material includes a bus bar that connects the battery cells to each other, and
    the radiator is thermally coupled to the bus bar connecting the battery cells to each other, and further comprising:
    a battery management unit placed between the cell unit and the radiator, and that includes a through hole for the bus bar to thermally couple to the radiator, the battery management unit configured to manage the cell unit, wherein
    the radiator is thermally coupled to the battery management unit.

2. The storage battery device according to claim 1, wherein
    the electric flow path material includes a positive-electrode-side terminal and a negative-electrode-side terminal that are included in at least one of the battery cells, and
    the radiator is thermally coupled to the positive-electrode-side terminal and the negative-electrode-side terminal.

3. The storage battery device according to claim 1, further comprising:
    a DC-DC converter electrically connected to the cell unit via the electric flow path material, the DC-DC converter configured to boost a voltage of electric power of the cell unit for output, and step down a voltage of external electric power for output to the cell unit, wherein
    the radiator is thermally coupled to the DC-DC converter.

4. The storage battery device according to claim 3, wherein
    the electric flow path material includes a bus bar that connects the cell unit to the DC-DC converter, and
    the radiator is further thermally coupled to the bus bar connecting the cell unit to the DC-DC converter.

5. The storage battery device according to claim 1, wherein
    the radiator includes a hollow part that allows a coolant to flow through an inside thereof.

6. The storage battery device according to claim 5, further comprising:
    an air blower configured to blow cooling air as the coolant to the radiator.

7. The storage battery device according to claim 3, wherein:
    the radiator includes a hollow part that allows a coolant to flow through an inside thereof, and
    the DC-DC converter and the battery management unit are disposed at opposing sides of the radiator via the hollow part and are thermally coupled to the radiator.

8. The storage battery device according to claim 1, wherein
    the radiator includes a heat pipe.

9. The storage battery device according to claim 4, wherein the bus bar includes a bus bar connecting two battery cells together, a bus bar that connects a positive-electrode-side cell charge and discharge terminal to a high-potential side of the DC-DC converter, and a bus bar that connects a negative-electrode-side cell charge and discharge terminal to a lower-potential side of the DC-DC converter.

10. The storage battery device according to claim 1, wherein the radiator is thermally coupled to the bus bar by a heat conductive material with insulating properties.

11. The storage battery device according to claim 10, wherein the radiator is thermally coupled to the bus bar by the heat conductive material in a through hole between the radiator and the bus bar.

12. The storage battery device according to claim 2, wherein the radiator includes protrusions to be thermally coupled to the positive-electrode-side terminal and the negative-electrode-side terminal.

13. The storage battery device according to claim 12, wherein the protrusions of the radiator are thermally coupled to the positive-electrode-side terminal and the negative-electrode-side terminal by a heat conductive material with insulating properties.

14. The storage battery device according to claim 5, wherein the radiator includes joints connected to a coolant supply system to connect to the hollow part that allows the coolant to flow through an inside thereof.

15. The storage battery device according to claim 1, wherein the radiator is a heat pipe structure including an evaporator, a heat insulator, and a condenser.

16. A storage battery device, comprising:
a cell unit including a plurality of battery cells;
an electric flow path material configured to form a current path through which electric power is supplied from or to the battery cells;
a radiator thermally coupled to the electric flow path material;
a DC-DC converter electrically connected to the cell unit via the electric flow path material, the DC-DC converter configured to boost a voltage of electric power of the cell unit for output, and step down a voltage of external electric power for output to the cell unit, wherein the radiator is thermally coupled to the DC-DC converter; and
a battery management unit electrically connected to a bus bar that connects the battery cells to each other, the battery management unit configured to manage the cell unit, wherein
the radiator includes a hollow part that allows a coolant to flow through an inside thereof, and
the DC-DC converter and the battery management unit are disposed at opposing sides of the radiator via the hollow part and are thermally coupled to the radiator.

17. The storage battery device according to claim 16, wherein
the electric flow path material includes a bus bar that connects the cell unit to the DC-DC converter, and
the radiator is further thermally coupled to the bus bar connecting the cell unit to the DC-DC converter.

18. The storage battery device according to claim 17, wherein the bus bar includes a bus bar connecting two battery cells together, a bus bar that connects a positive-electrode-side cell charge and discharge terminal to a high-potential side of the DC-DC converter, and a bus bar that connects a negative-electrode-side cell charge and discharge terminal to a lower-potential side of the DC-DC converter.

* * * * *